United States Patent [19]
Grace

[11] Patent Number: 5,207,963
[45] Date of Patent: May 4, 1993

[54] METHOD OF MOLDING PLASTIC-BACKED CARPET

[75] Inventor: Ronald R. Grace, Hamilton, Ohio

[73] Assignee: Nifty Products, Inc., Hamilton, Ohio

[21] Appl. No.: 219,358

[22] Filed: Jul. 15, 1988

[51] Int. Cl.$^5$ .................. B29C 51/08; B29C 51/32; B29L 31/58

[52] U.S. Cl. .................. 264/163; 264/257; 264/291; 264/322; 264/324; 264/325; 264/DIG. 65; 425/186; 425/195; 425/510; 425/397; 425/400; 425/403.1; 425/DIG. 39

[58] Field of Search ............... 264/322, 324, 325, 291, 264/292, 257, 258, 241, 243, 135, 136, 137, 134, DIG. 65, DIG. 73, 320, 163; 425/400, 397, 501, 502, 327, 339, 402, 403.1, DIG. 38, DIG. 39, DIG. 41, DIG. 201, 388, 384, 186, 195, 510; 72/361, 364

[56] References Cited

U.S. PATENT DOCUMENTS

| | | | |
|---|---|---|---|
| 2,266,846 | 12/1941 | Buff | 264/324 |
| 2,759,217 | 8/1956 | Peterson | 264/291 |
| 2,918,696 | 12/1959 | Bottoms et al. | 264/291 |
| 2,939,179 | 6/1960 | Penman et al. | 264/134 |
| 2,986,777 | 6/1961 | Carter | 264/324 |
| 3,115,678 | 12/1963 | Keen et al. | 264/322 |
| 3,328,839 | 7/1967 | Treece et al. | 425/397 |
| 3,388,018 | 6/1968 | Squier et al. | 264/257 |
| 4,432,716 | 2/1984 | Kiss | 264/324 |

Primary Examiner—Jeffery Thurlow
Assistant Examiner—Mathieu Vargot
Attorney, Agent, or Firm—Charles R. Wilson

[57] ABSTRACT

A method of molding a plastic-backed carpet blank to a desired shape uses a minimum of work force and carpet material. The method utilizes a portable frame assembly having an open rack with yieldable holding clamps. The holding clamps are used to suspend a plastic-backed carpet blank in the rack. The frame assembly has a set of wheeled legs which allows it to be readily transported between work stations such as a heating zone and a molding zone. The yieldable holding clamps maintain the carpet under constant tension during the molding zone to result in a high quality molded carpet.

23 Claims, 5 Drawing Sheets

FIG. 9

METHOD OF MOLDING PLASTIC-BACKED CARPET

METHOD OF MOLDING PLASTIC-BACKED CARPET

This invention relates to a method of molding carpet. More particularly, the invention relates to a method of molding plastic-backed carpet to a shape which conforms to the irregular contour of a motor vehicle's inside floor surface.

Most motor vehicles being produced today have their inside floor surface covered with a carpet. The carpet is primarily for appearance purposes and secondarily for comfort, acoustic and protective purposes. A problem with installing carpet in a motor vehicle results from the many varied shapes often found in the vehicle's floor surface. A center hump in the floor surface is often provided to accommodate a drive shaft. Protrusions and recesses are also often built into the floor area for aesthetic reasons and functional reasons. Protrusions for wheel wells can be quite pronounced. Any carpet intended to cover such an irregular floor surface area must be able to conform to the irregular surface.

Carpets manufactured for use on the irregular floor surface of a motor vehicle are typically molded to the desired shape. A high quality carpet is provided with a backing of a thermoplastic material. The thermoplastic materials are capable of being softened by heat, molded to a desired shaped, and finally cooled to set the shape. The resultant plastic-backed carpet has a shape which permits ready installation in the vehicle. The molded carpet is simply properly positioned and secured at its edge portions. A minimum of cutting and manual shaping is needed to achieve a smoothly carpeted floor area.

Known methods of molding carpet are very labor intensive and have a substantial amount of carpet material wastage. Thus, a plastic-backed carpet is initially cut to the same general shape as the floor area to be covered. The carpet blank is placed in a flattened state in an oven to soften the plastic backing. The heated carpet blank is then hand-carried to a set of male and female molds. The carpet blank must be held under tension by at least two and up to six workers as the two molds with the main body of the blank between them are closed together. Sufficient tension must be exerted by those holding the carpet blank to keep the molds from pulling portions of the carpet within it and/or molding a permanent wrinkle into the carpet. Worker carelessness and fatigue are responsible for significant quality control problems.

Attempts have been made to automate methods of molding carpet. A method as described in U.S. Pat. No. 2,939,179 to Penman et al is one example of such an attempt. A frame is designed to hold a carpet blank throughout the steps of carpet molding. The frame is built to move along fixed side rails to convey the carpet blank from an initial heating stage to a final cutting stage. While successful to an extent, the method is inflexible in handling varied sizes and weights of carpet. As can be imagined, a large range of carpet sizes and carpet weights are required to meet vehicle manufacturers' specifications. Still other more labor intensive and/or capital intensive methods are used throughout industry to mold carpet. They all suffer in efficiency or flexibility to different degrees.

SUMMARY OF THE INVENTION

A method of molding a plastic-backed carpet to a contoured shape to fit a motor vehicle's interior floor surface area uses a minimum of carpet raw material and work force. The method comprises initially positioning and clamping a carpet blank in a frame assembly. The frame assembly comprises an open rack, a set of legs with wheels, and yieldable holding means mounted around the periphery of the open rack. The frame assembly is portable in nature in that it can be readily moved from work station to work station by a single worker. The frame assembly with the carpet blank yieldably clamped in the open rack is initially moved into a heat zone to soften the plastic backing and then moved to a molding zone. A set of male and female molds are brought together with the heated carpet blank in the middle. The yieldable means holding the carpet blank in the open rack maintain a constant tension on the carpet as the molds draw together. The carpet blank can be suspended in the open rack throughout the complete sequence of steps of producing the molded carpet.

DETAILED DESCRIPTION OF THE INVENTION

Figure 1:
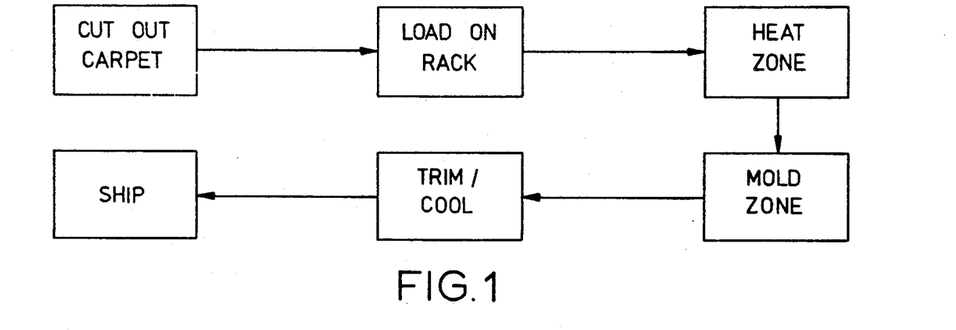
FIG. 1 is a schematic diagram showing the various method steps which are carried out in accordance with this invention to produce a molded carpet.

The description of the invention which follows is made with particular reference to the drawings. FIG. 1 shows in schematic form the basic steps of the method while FIGS. 2-9 show the equipment used in the method steps.

The method of the invention uses a plastic-backed carpet material. Such carpet materials are commercially available. The particular weight and color of the carpet are usually specified by the vehicle manufacturer for new vehicles or the vehicle's owner for those vehicles whose original carpet is being replaced. A carpet weight of at least about 8 oz., preferably from about 8 oz. to about 30 oz. is generally used. A thermoplastic material which is tough, elastic and non-tacky is used as the backing. Examples of such backings include polymers of ethylenevinyl acetate, ethylene, and acrylic acid. The backings are applied to the carpet in any manner, e.g. from a dispersion or by extrusion. The thermoplastic backing material is preferably capable of being softened at a temperature of from about 300° F. to about 500° F. to a sufficient degree to be readily molded.

With reference to FIG. 1, the carpet to be molded is cut to a size which is sufficient to result in a complete molded carpet piece, yet with as little excess as possible. Obviously, excess carpet material which must later be trimmed off the molded carpet and discarded is a waste. As discussed in the following paragraphs, the method of this invention is able to use less carpet material without affecting the quality of the molded carpet product. Interior floor surface areas of most motor vehicles are rectangular in shape; accordingly, the carpet blanks are also cut to this same general shape. The carpet's dimensions approximate the outside dimensions of a mold used in a later stage of the method. Generally, the resultant carpet blank has an area of from about 10 square feet to about 100 square feet.

The carpet blank is next placed within an open rack on a portable frame assembly and clamped by yieldable holding means. The carpet blank remains clamped on the open rack throughout subsequent steps of the method. Thus, the frame assembly with the carpet blank yieldably clamped within it is next moved into a heating zone. The carpet blank remains in the heating zone sufficiently long to soften the plastic-backing on the carpet blank. The carpet blank is promptly transported by the frame assembly into a molding zone. While still suspended within the open rack of the frame assembly, male and female molds are forced together under controlled pressure. Shaped cavities in the molds tend to draw outer portions of the carpet into them while the yieldable holding means on the carpet exert tension to keep the carpet free of wrinkles and uniform throughout this step.

The molded carpet is finally cooled to set the thermoplastic backing and trimmed. Typically, these steps occur while the carpet is still positioned between the molds, though can as well be done in separate steps and in either order. The resultant molded carpet retains the contour imparted by the mold due to the nature of the plastic material. The molded carpet is ultimately shipped and installed in a motor vehicle simply by properly positioning it and securing the edges. The preformed carpet follows the contour of the vehicle's floor surface area.

With particular reference to FIGS. 2–6, there is shown a portable frame assembly used in the method of this invention. The frame assembly shown generally as 10, comprises an open rack 11 of a generally rectangular shape with legs 12 at each corner. The open rack's dimensions are dependent on the particular carpet size being run. However, the nature of the holding means is such that one open rack will accommodate a range of carpet blank sizes. The rack itself has four rails each attached at its respective ends to an adjoining rail by conventional means, e.g. welds or bolts and nuts. Thus, side rails 13 and 14 and end rails 15 and 16 form the open rack.

Figure 2:
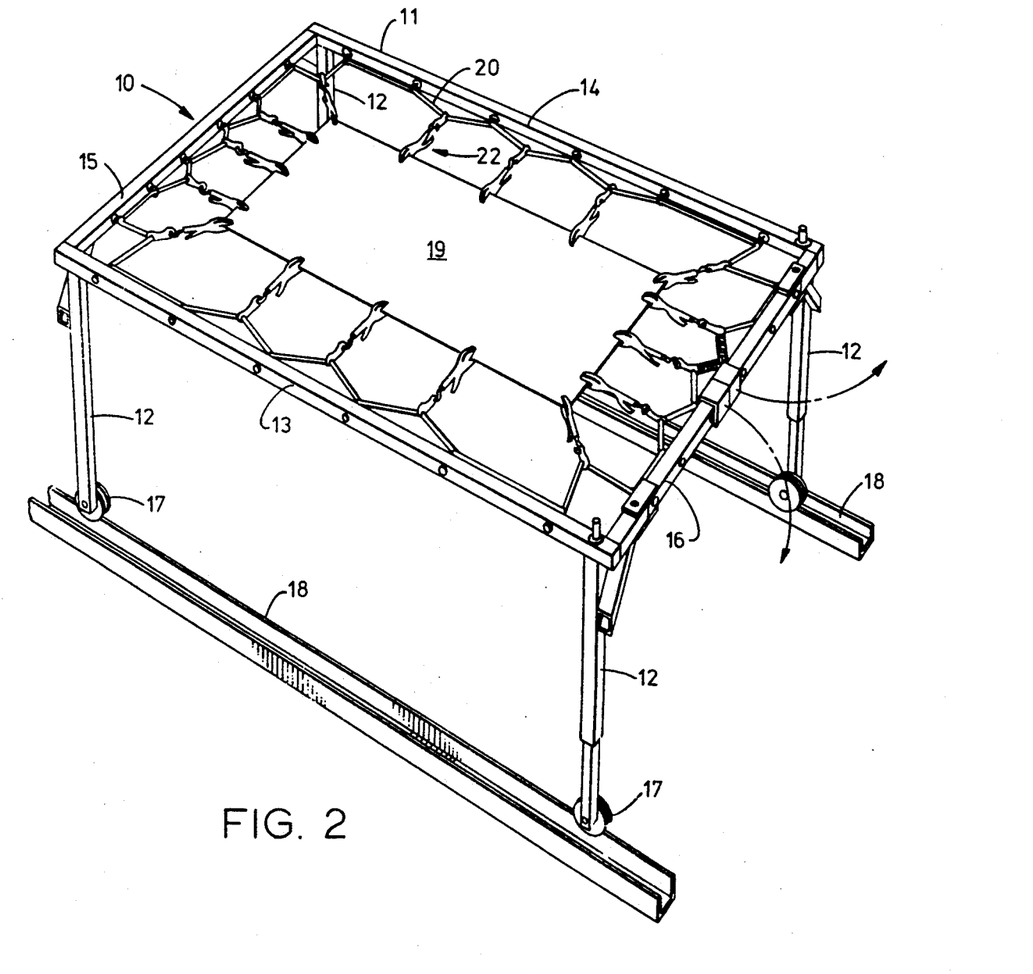
FIG. 2 is a view in perspective showing a frame assembly used in the method of the invention.

The legs 12 extend from the open rack and are dimensioned in accordance with the height requirements imposed by equipment found in subsequent steps. Preferably, the legs on at least one end have means by which their heights can be adjusted according to need. Thus, different molds will dictate the use of frame assemblies wherein the carpet blank is suspended at varying distances from ground surface. Several means for adjusting the length of the legs are usable. For example, hollow legs with a spring-loaded mechanism within each and an operably associated crank arm is usable. Telescoping legs with peg holding means is another example.

A wheel 17 secured at the lower extremity of each leg renders the frame assembly portable and easily moved from one treatment zone to the next. As most evident from FIGS. 2 and 6 the wheels have a V-groove in their periphery for the purpose of riding along floor rails 18. The floor rails are anchored to a floor surface and are laid out to lead continuously through the treatment zones.

Figure 3:
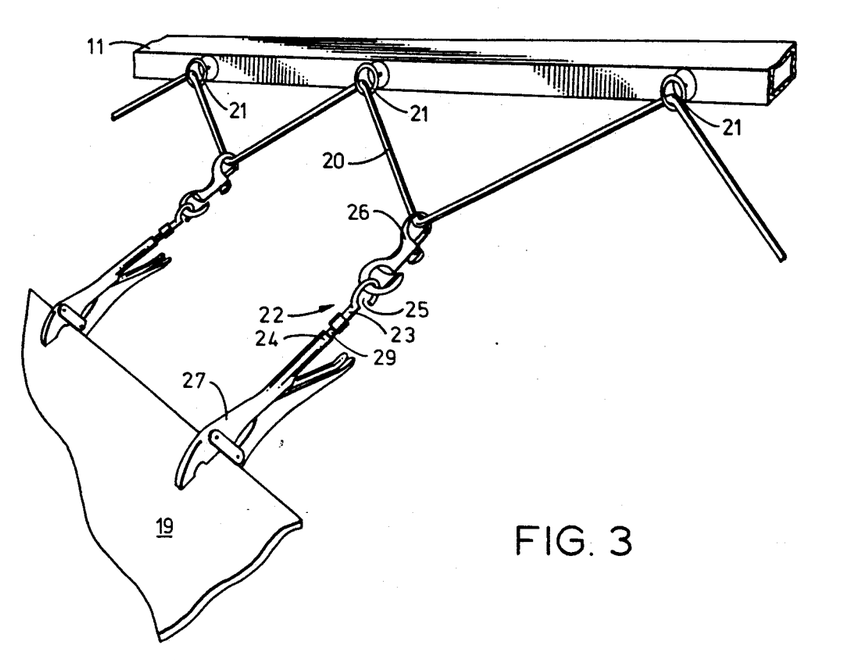
FIG. 3 is a view in perspective of a portion of the frame assembly of FIG. 2 showing yieldable holding means.

Carpet blank 19 is movably suspended within the open rack. A yieldable holding means comprised of elastic cord 20 and clamp means 22 is used for this purpose. Elastic cord 20 which is secured by eye screws 21 to the open rack extends completely around the inside periphery of the open rack. A set of clamp means are individually secured at one end to the elastic cord. Clamp means 22 are conventional vise grips which have been modified by the addition of a screw attachment means 23 at vise grip extremity 24. The screw attachment means 23 has a suitably dimensioned opening 25 which, if desired, allows it to freely move along the elastic cord to a desired clamping position. A clip 26 is preferably used for a more secure attachment to the elastic cord. The degree of force exerted by gripping extremity 27 of the vise grip is controlled by adjusting screw means 29. Typically, at least ten clamp means are positioned on the elastic cord. The number of clamp means needed is dependent on the carpet blank size and the cavities of the molds. The purpose of the yieldable holding means is to suspend the carpet within the open rack during processing in all steps and to hold all portions of the carpet blank under controlled tension during the molding operation. Generally speaking, deep cavities in the molds tend to draw edges of the carpet blank more with the result being that extra clamp means are employed in areas of the carpet which are proximate the cavities.

The carpet blank is readily loaded in the open rack. Most conveniently, the cut carpet blanks are stacked on a work table positioned between the rails 18. The height of the table is about the same as the height of the open rack. By positioning the frame assembly and open rack directly over the work table, a carpet blank is clamped to the yieldable holding means in a sequential manner until fully clamped. The frame assembly 10 with the carpet blank suspended within the open rack is wheeled along the rails to the next work station. A single worker is capable of loading the carpet blank and moving it along to the proper work station.

Figure 4:
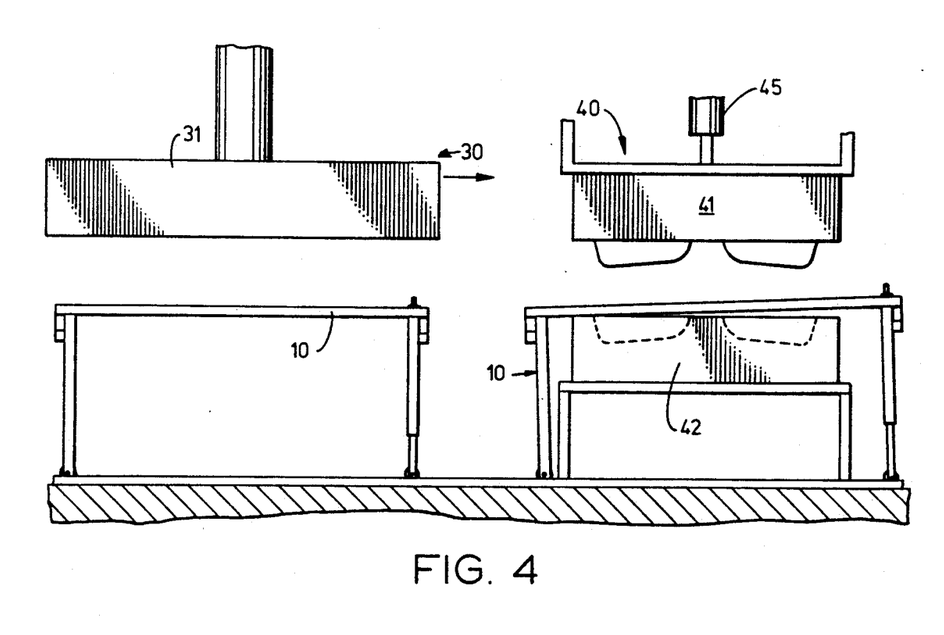
FIG. 4 is a side view showing carpet blanks individually mounted in two of the frame assemblies of FIG. 2 and positioned in a heating zone and a molding zone, respectively.

The frame assembly and suspended carpet are initially moved into a heat zone 30. A bank of heaters (not shown) is suspended in the hood of oven 31. An adequate number of heaters are employed so as to overlap the carpet edges to substantially evenly heat the carpet. Sufficient heat is imparted to the carpet to soften the plastic backing of the carpet to a pliable or moldable state. The amount of heat and dwell time in the oven will depend on the particular plastic backing and its thickness. Generally, the carpet blank is left in the heat zone until a carpet surface temperature of from about 300° F. to about 500° F. is reached.

Any conventional heat source is used in the heating zone. Nicrone coated wire heaters are preferred because of the intense heat they are able to quickly generate. Quartz heaters and forced air can as well be used to accomplish the stated purpose.

The heated plastic-backed carpet blank is promptly transferred by movement of the frame assembly 10 along the floor rails to molding zone 40. Optionally, the floor rails have pre-set stop means to aid in precisely positioning the frame assembly for the molding operation. Thus, each rail can have a stop such as a bracket which is hingably attached and activated simply by swinging it into engagement with a wheel. The pre-set stops have the effect of speeding up the process and improving on the quality of the molded carpet. Preferably each stage, or at least the molding stage, has such stops installed. Other stops such as air cylinders and stationary blocks can as well be used.

Male mold 41 and female mold 42 are contoured to impart the desired shape to the carpet. Such molds, of course, are contoured according to the particular motor vehicle's floor surface area. The mold is fabricated from fiberglass reinforced resinous material or cast metal e.g. aluminum. The later molds are more durable and can be further modified with water cooling, though are more expensive. Pneumatic pressure means 45 are used to force the molds together.

The heated carpet blank is initially suspended by the open-rack between the two molds 41 and 42. As the molds are forced together, the carpet blank follows the moving mold surfaces. The yieldable holding means are put under tension by the carpet being drawn into the mold. Certain of the holding means, such as those nearest a deep mold cavity, are placed under a greater amount of tension. The tension exerted by the yieldable holding means prevents any edge portion of the carpet from completely entering into the mold area.

Optionally, a felt pad underlay is placed between the heated carpet blank and the female mold prior to the molds being forced together. The felt pad is to add a degree of durability and comfort to the carpet and is sometimes specified by the carpet installer. The portable nature of the frame assembly used in the method of this invention allows the felt pad to be easily inserted at this stage.

The molded carpet is preferably trimmed while still between the molds. At the same time, the carpet is being cooled by ambient temperature or refrigerated molds. After about one minute, the carpet is sufficiently cooled for the thermoplastic backing to be set to its molded configuration. The molds are then separated and the molded carpet set aside for shipment to the carpet installer.

Figure 5:
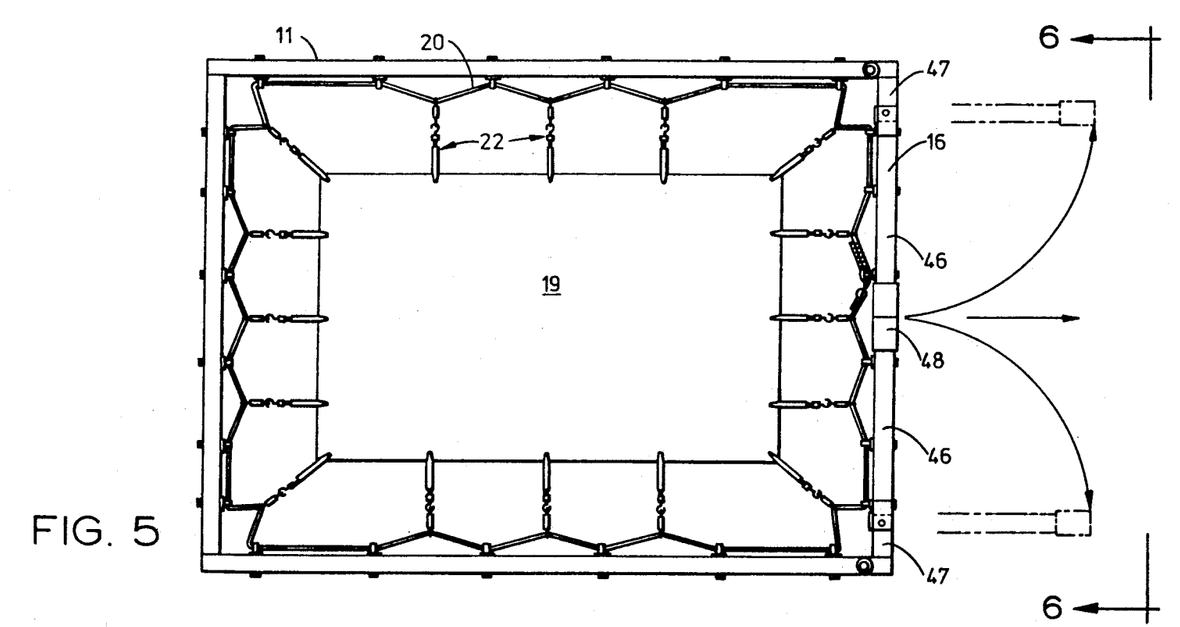
FIG. 5 is a top view of the frame assembly of FIG. 2 with a break-away end-rail shown in phantom in an open position.

In a preferred embodiment, at least one end rail has means by which the rail can be broken apart. As best seen in FIGS. 2 and 5, end rail 16 is comprised of two substantially equal lengths. Each length 46 is pivotably secured to end rail portions 47, which in turn extend from the side rails. A hold means such as a slip collar 48 is used to hold the two lengths together. When a carpet blank is released from the holding means and the slip collar disengaged, the two end rail lengths pivot outwardly. This allows the frame assembly to be returned to the initial loading stage while the carpet is left in the molds to cool.

Figure 7:
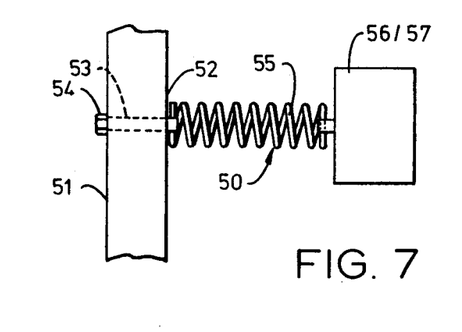
FIG. 7 is a top view of an alternative yieldable holding means positioned in a portion of a frame assembly.

An alternative yieldable holding means is shown in FIG. 7. A set of tension means 50 are movably positioned around the inside surface of the open rack of a frame assembly. One end of each tension spring is attached to the open rack. A second end has gripping surfaces for securely clamping onto the carpet blank. For example, the rail 51 of the frame assembly has longitudinal slots 52 formed in its surface to accommodate a bolt 53 and nut 54. A tension spring 55, secured at one end to the bolt 53, has a set of end clamps 56 and 57 for gripping and holding the carpet blank. If needed, the tension in each spring is adjusted depending on its location on the rack and anticipated tension during the molding operation.

Figure 8:
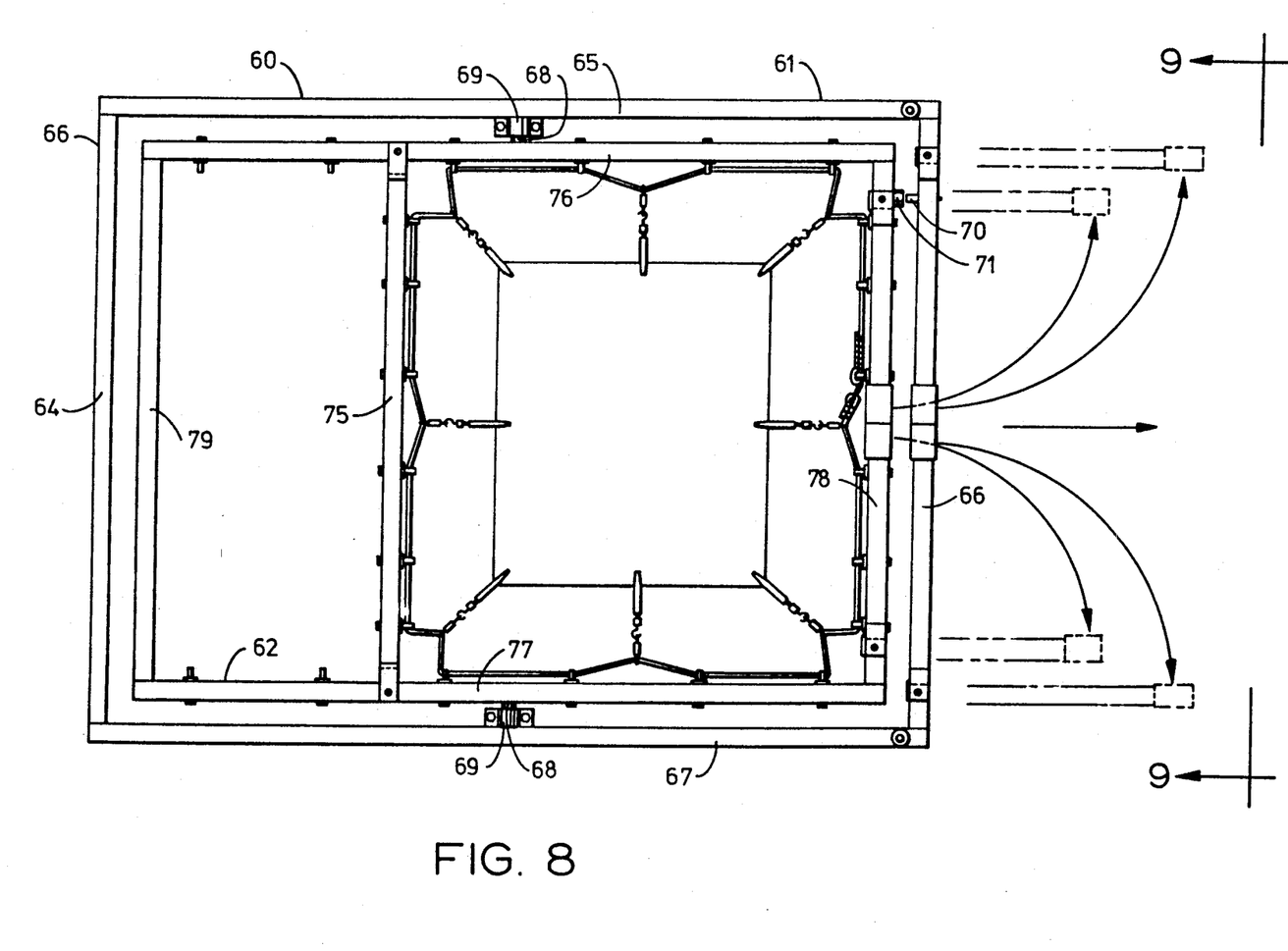
FIG. 8 is a top view of a frame assembly used in another embodiment of the method of this invention wherein a carpet blank held in the frame assembly can be readily turned over for fast heating purposes.
Figure 9:
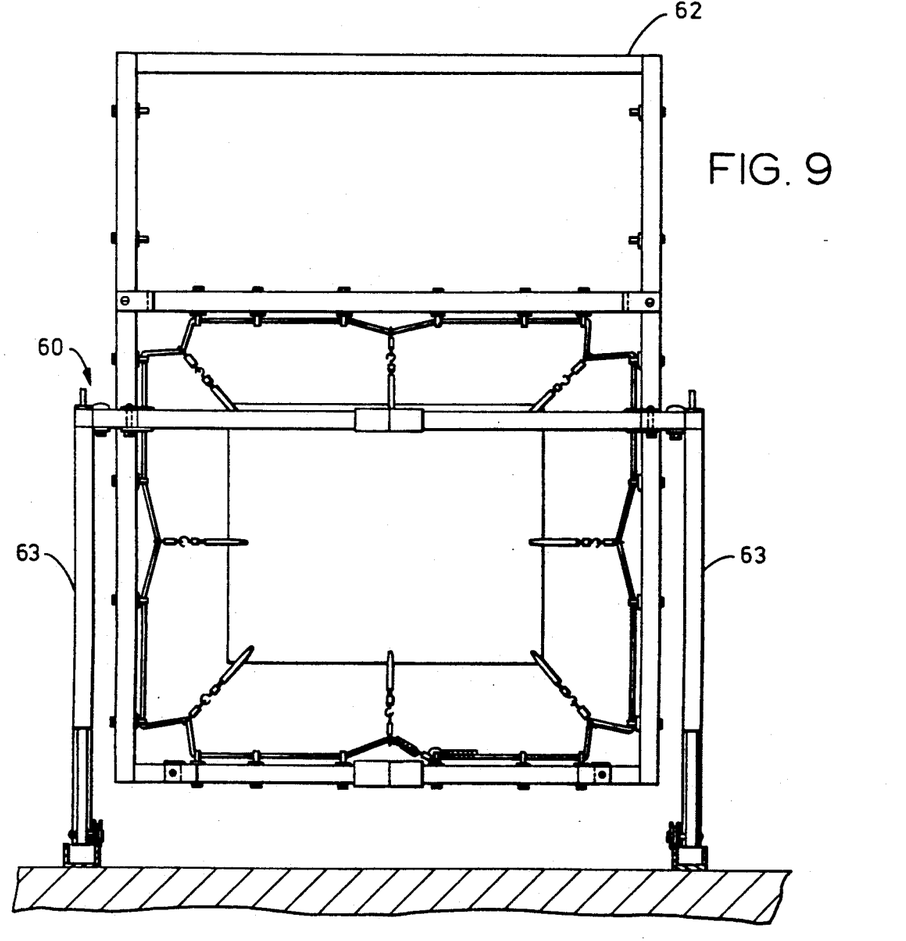
FIG. 9 is an end view of the frame assembly of FIG. 8 showing an open rack with the carpet blank mounted therein in the process of being revolved.

FIGS. 8 and 9 illustrate a frame assembly which is most useful in this invention with carpet blanks having a thick plastic backing. In order to soften such plastic backings without singeing the fabric of the carpet it is necessary that the plastic backing be heated directly. That is, the plastic-backing should be directly opposite the heat source in the heating zone. For an overhead set of quartz heaters, this means the carpet must be clamped into the portable frame assembly so that its plastic backing is facing upwards. However, after being heated, the plastic-backed carpet must be flip flopped so that the plastic-backing contacts the surface of the bottom mold. This is quite often necessary because of the usual, though optional, placement of felt pads in portions of the bottom mold and their subsequent adherence to the molded carpet. The frame assembly 60 allows the clamped carpet blank to be positioned plastic-backing up for heating purposes and plastic-backing down for molding purposes in a convenient fashion.

Frame assembly 60 has a fixed frame 61 and a pivotably mounted open rack 62 positioned within the frame 61. Fixed frame 61 is generally rectangular in shape and has four legs 63 attached at its four corners. The individual rails 64–67 of fixed frame 61 are permanently attached at their extremities to one another. Open rack 62 is dimensioned to fit within fixed frame 61. The open rack is pivotably mounted by pivot pins 68 which extend from the rack into receiving fittings 69 on the fixed frame. The pivot points are located in the centers of side rails 65 and 67 and the height the frame assembly is such that the open rack can revolve completely about its pivot points in either direction. Stop means 70 are found near at least one corner of the fixed frame to engage receiving means 71 found on the open rack so as to secure the open rack to the frame assembly and steady it during treatment stages.

The pivot points on the open rack 62 of frame assembly 60 can as well be positioned at mid-point of the end rails if desired. Pivot points on the side rails, though, are preferred in that this allows the end rail 66 to open in the manner above discussed.

Figure 6:
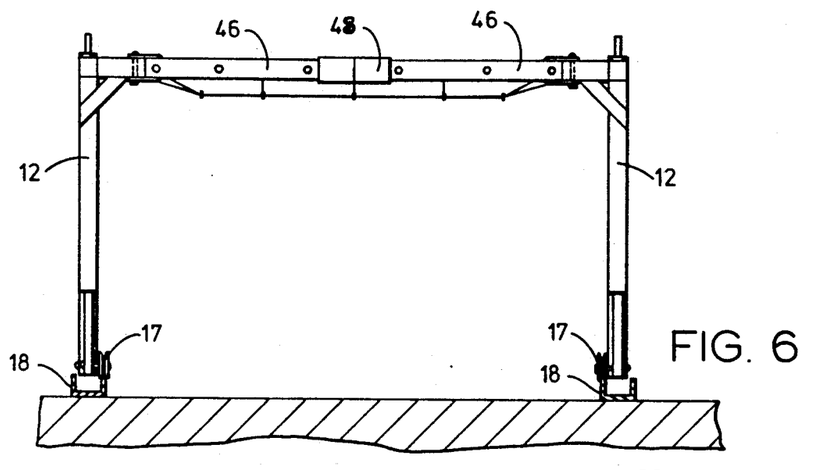
FIG. 6 is an end view of the frame assembly of FIG. 5.

A cross bar 75 is movably mounted on the side rails of the open rack 62. It is moved according to the length of the carpet blank being molded. The cross bar is an optional feature which adds another measure of flexibility to the method herein described. An elastic cord with yieldable holding means as described with reference to FIGS. 2–6 is positioned on the inside surfaces of rails 76, 77 and 78 and cross bar 75. The elastic cord can as well be positioned on all the rails 76–79 of the pivotably mounted open rack 62. End rails 66 and 78 on the fixed frame and pivotably mounted open rack, respectively are constructed to open. End rail half lengths and slip collars similar to that described with reference to FIGS. 2 and 6 are used.

In operation, a plastic-backed carpet blank of a predetermined size is clamped into the open rack of the frame assembly by yieldable holding means. The assembly is wheeled along floor rails into a heating zone to sufficiently soften the plastic backing and then into a molding zone. Male and female mold close together with the heated plastic-backed carpet between them. The yieldable holding means maintain a constant force or tension on the carpet during this molding operation. A single worker is capable of loading the carpet in the frame assembly and moving it throughout the various stages. The yieldable holding means and open rack construction add a degree of flexibility in handling various carpet sizes. A high quality carpet molded to specification results from the method.

While the invention has been described with particular reference to the drawings, it should be understood obvious variations and modifications may be made. For example, instead of wheels, slide blocks can be used. A pair of cross bars can also be positioned across two of the frame assembly rails to reduce its area so as to accommodate smaller sized carpet blanks. Such changes are within the scope of the following claims.

What is claimed is:

1. A method of molding a plastic-backed carpet to a contoured shape designed to fit the interior floor area of a motor vehicle wherein the method requires a minimum of carpet material and work force, comprising the steps of:
   (a) positioning a plastic-backed carpet blank within a portable frame assembly, said frame assembly having a fixed open rack of rails attached together to form a shape approximating the carpet blank, a set of legs extending from the open rack with each of said legs having a wheel mounted at a bottom extremity for the purpose of moving the frame assembly during treatment stages, and a yieldable holding means mounted on the open rack for holding the carpet blank at selected areas, said yieldable holding means having an elastic cord secured to an inside surface of the rack and a set of clamp means wherein each clamp means is movably secured at one end to the elastic cord and at a second end to the plastic-backed carpet blank;
   (b) clamping the plastic-backed carpet blank to the yieldable holding means mounted on the open rack so that the carpet blank is suspended under a substantially constant tension within the open rack of the frame assembly;
   (c) moving the frame assembly with the plastic-backed carpet blank into a heating zone;
   (d) heating the plastic-backed carpet blank for a time and a temperature sufficient to soften the plastic backing so as to be moldable;
   (e) moving the frame assembly with the heated plastic-backed carpet blank to a molding zone comprised of male and female molds;
   (f) molding the heated plastic-backed carpet blank to the contour of the molds by causing said male and female molds to come together under pressure such that the shape defined by the molds is imparted to the plastic-backed carpet blank; and
   (g) cooling the molded plastic-backed carpet blank sufficiently to set its molded configuration.

2. The method of claim 1 further comprising the step of trimming excess material from the plastic-backed carpet blank while still positioned between the molds.

3. The method of claim 1 wherein at least ten clamp means are mounted on the elastic cord.

4. The method of claim 3 wherein at least one clamp means is positioned on the open rack and clamped to the plastic-backed carpet blank at a point approximately opposite wherein a contoured shape in the molds is found so as to attain maximum tension at said point during the molding step.

5. The method of claim 1 further wherein a set of floor rails secured to a floor surface is laid out to lead continuously from a zone where the carpet blank is positioned and clamped in the frame assembly to the heating zone and then to the molding zone.

6. The method of claim 2 further wherein a set of floor rails secured to a floor surface is laid out to lead continuously from a zone where the carpet blank is positioned and clamped in the frame assembly to the heating zone and then to the molding zone.

7. The method of claim 1 wherein the plastic-backed carpet blank has a weight of at least about 8 oz.

8. The method of claim 7 wherein the plastic-backed carpet blank has a surface area of from about 10 square feet to 100 square feet when suspended in the open rack prior to the molding step.

9. A method of molding a heavy weight plastic-backed carpet to a contoured shape designed to fit the interior floor area of a motor vehicle wherein the method requires a minimum of carpet material and work force, comprising the steps of:
   (a) positioning a plastic-backed carpet blank with a thick plastic-backing within a portable frame assembly, said frame assembly having a fixed frame of two side rails and two end rails in a shape approximately the carpet blank, a set of legs extending from the fixed frame with each of said legs having a wheel mounted at a bottom extremity for the purpose of moving the frame assembly during treatment stages, an open rack of the approximate shape of the fixed frame pivotably mounted within the fixed frame so as to be capable of revolving completely about its points of pivotable mounting and a set of yieldable holding means mounted on the open rack for holding the carpet blank at selected areas;
   (b) clamping the plastic-backed carpet blank to the yieldable holding means mounted on the open rack so that the carpet blank is suspended under a substantially constant tension with the open rack of the frame assembly and with its plastic-backing facing upwards;
   (c) moving the frame assembly with the plastic-backed carpet blank into a heating zone;
   (d) heating the plastic-backed carpet blank for a time and a temperature sufficient to soften the plastic backing so as to be moldable;
   (e) revolving the open rack of the frame assembly a half-turn so that the plastic backing of the carpet blank is facing downwards;
   (f) moving the frame assembly with the heated plastic-backed carpet blank to a molding zone comprised of male and female molds; and
   (g) molding the heated plastic-backed carpet blank to the contour of the molds by causing said male and female molds to come together under pressure such that the shape defined by the molds is imparted to the plastic-backed carpet blank.

10. The method of claim 9 wherein the carpet blank remains in the molds until the plastic-backing has cooled sufficiently to set to its molded configuration.

11. The method of claim 10 wherein the carpet blank is trimmed of excess material while positioned between the molds.

12. The method of claim 10 wherein the yieldable holding means mounted on the open rack is an elastic cord secured to an inside surface of the rack and a set of clamp means, each movably secured at one end to the elastic cord and at a second end to the plastic-backed carpet blank.

13. The method of claim 12 wherein at least ten clamp means are mounted on the elastic cord.

14. The method of claim 10 wherein the yieldable holding means is a set of spring clamps secured to an inside surface of the rack so as to be individually adjusted according to the degree of tension to be exerted on the plastic-backed carpet blank during the molding stage.

15. The method of claim 10 wherein at least one end rail on each of the fixed frame and open rack is capable of opening.

16. The method of claim 15 wherein each of the end rails which is capable of opening is comprised of two sections held together by a slip collar and further wherein each of the sections is pivotably mounted so that when the slip collar is disengaged the sections pivot outwardly.

17. The method of claim 10 further comprising the step of placing a felt pad underlay between the heated plastic-backed carpet blank and a lower mold prior to causing the molds to come together.

18. The method of claim 10 further wherein the open rack has a movable cross bar extending from one side rail to an opposite side rail to accommodate different sized carpet blanks and the yieldable holding means is mounted at least partly on said cross bar.

19. The method of claim 10 wherein the plastic-backed carpet blank has a weight of at least about 8 oz.

20. The method of claim 10 wherein the plastic-backed carpet blank has a surface area of from about 10 square feet to about 100 square feet when suspended in the open rack prior to the molding step.

21. A method of molding a plastic-backed carpet to a contoured shape designed to fit the interior floor area of a motor vehicle wherein the method requires a minimum of carpet material and work force, comprising the steps of:
    (a) positioning a plastic-backed carpet blank within a portable frame assembly, said frame assembly having a fixed open rack of rails attached together to form a shape approximating the carpet blank and wherein at least one end rail is capable of opening, a set of legs extending from the open rack with each of said legs having a wheel mounted at a bottom extremity for the purpose of moving the frame assembly during treatment stages, and a set of yieldable holding means mounted on the open rack for holding the carpet blank at selected areas;
    (b) clamping the plastic-backed carpet blank to the yieldable holding means mounted on the open rack so that the carpet blank is suspended under a substantially constant tension with the open rack of the frame assembly;
    (c) moving the frame assembly with the plastic-backed carpet blank into a heating zone;
    (d) heating the plastic-backed carpet blank for a time and a temperature sufficient to soften the plastic backing so as to be moldable;
    (e) moving the frame assembly with the heated plastic-backed carpet blank to a molding zone comprised of male and female molds;
    (f) molding the heated plastic-backed carpet blank to the contour of the molds by causing said male and female molds to come together under pressure such that the shape defined by the molds is imparted to the plastic-backed carpet blank; and
    (g) cooling the molded plastic-backed carpet blank sufficiently to set its molded configuration.

22. The method of claim 21 wherein the yieldable holding means is a set of spring clamps secured to an inside surface of the rack so as to be individually adjusted according to the degree of tension to be exerted on the plastic-backed carpet blank during the molding stage.

23. The method of claim 21 wherein the end rail is comprised of two sections held together by a slip collar and further wherein each of the sections is pivotably mounted so that when the slip collar is disengaged the sections pivot outwardly.

* * * * *